J. ASPENLEITER.
MACHINE FOR COVERING PAPER BOXES.
APPLICATION FILED AUG. 4, 1902.

912,772.

Patented Feb. 16, 1909.
7 SHEETS—SHEET 2.

J. ASPENLEITER.
MACHINE FOR COVERING PAPER BOXES.
APPLICATION FILED AUG. 4, 1902.

912,772.

Patented Feb. 16, 1909.
7 SHEETS—SHEET 6.

Witnesses
C. W. Miles
W. McCormack

Inventor
John Aspenleiter
By Murray & Murray
Attorney

J. ASPENLEITER.
MACHINE FOR COVERING PAPER BOXES.
APPLICATION FILED AUG. 4, 1902.

912,772.

Patented Feb. 16, 1909.
7 SHEETS—SHEET 7.

UNITED STATES PATENT OFFICE.

JOHN ASPENLEITER, OF CINCINNATI, OHIO, ASSIGNOR, BY DIRECT AND MESNE ASSIGNMENTS, TO STOKES AND SMITH COMPANY, OF PHILADELPHIA, PENNSYLVANIA, A CORPORATION OF NEW JERSEY.

MACHINE FOR COVERING PAPER BOXES.

No. 912,772.  Specification of Letters Patent.  Patented Feb. 16, 1909.

Application filed August 4, 1902. Serial No. 118,231.

*To all whom it may concern:*

Be it known that I, JOHN ASPENLEITER, a citizen of the United States of America, and resident of Cincinnati, county of Hamilton, State of Ohio, have invented certain new and useful Improvements in Machines for Covering Paper Boxes, of which the following is a specification.

The object of my invention is a machine for turning the paper covering around the edges of paper boxes, automatically. This object is attained by the means described in the specification, specifically pointed out in the claims and illustrated in the accompanying drawings, in which.

A description of the operation of the machine will be outlined now in brief, and then a detail description will be given of the parts which carry out the successive steps.

Figure 14:
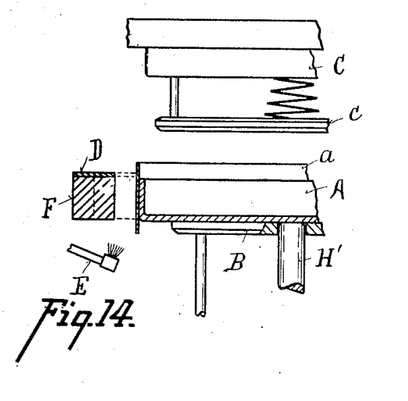
Figs. 14 through 19 are detail views showing the respective steps of the operation.
Figure 15:
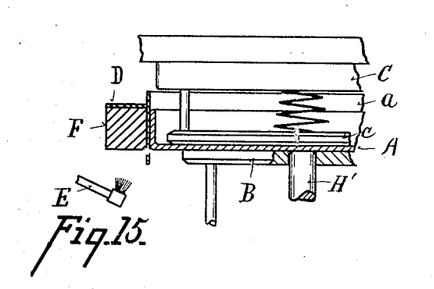
Figure 16:
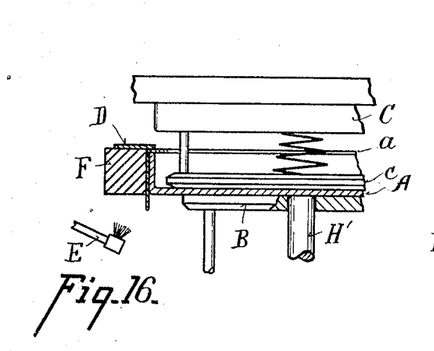
Figure 17:
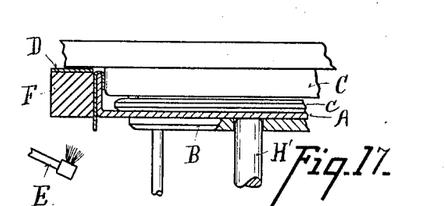
Figure 18:
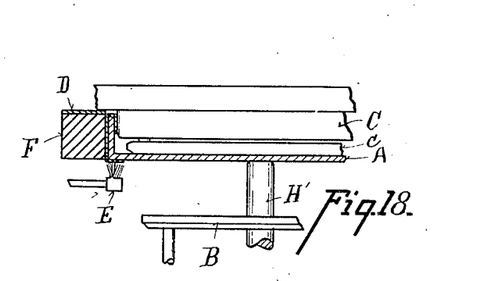
Figure 19:
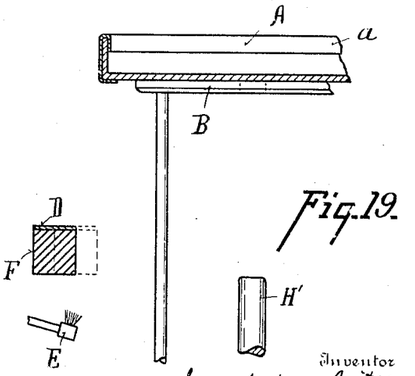

Referring to Figs. 14 through 19, the box A upon which the paper covering is to be placed has had the paper strip $a$ pasted around its sides, leaving the ends of the strip projecting above and below the box as shown in Fig. 14, before it is brought to my machine. The box is then placed upon the base plate B. The frames F then are brought inward to center the box beneath the head and then the retaining plate $c$ of the reciprocating head C descends into the bottom of the box to hold it firmly upon the base B. Then bars D are carried inward carrying the paper inward over the upper edge of the box, as shown in Fig. 16. Then the head C descends into the box and carries the paper firmly against the inner face of the box. Frame F is then pressed farther inward against the sides of the box to press the paper firmly against them. The base B then descends, the box then being supported upon stud H′, and brushes E carry the paper inward around the bottom edge of the box. The brush E is then drawn downward away from the bottom of the box, frame F is withdrawn from the sides, and base B is carried upward as shown in Fig. 19 carrying the completed box clear of the machine. The parts which effect these steps will now be described in detail. Table H is supported upon standards $h$ and has upwardly projecting rods $h'$, which support a top plate $h^2$ which support vertical ways $h^3$. Base plate B has two vertical rods $b$ $b'$ which pass downward through table H and have a rod $b^2$ connecting them at their lower ends. Plate B has likewise a center perforation through which projects a short stud H′, which is supported by table H. Rod $b^2$ is connected by a link $b^3$ to a lever $b^4$ which is fulcrumed upon a fixed rod H² which is supported by standards $h$. Between rod H² and link $b^3$ lever $b^4$ is connected by a link $b^5$ to another lever $b^6$, which is pivoted upon a fixed rod $k^2$ which is supported between standards $k^3$, themselves supported by foundation plate K. Beneath lever $b^6$ is a cam $b^7$ mounted upon main shaft M. Cam $b^7$ contacts lever $b^6$ to raise it and thereby raises the base plate B after the operation of covering a box has been completed, as shown in Fig. 19.

Frames F for centering the boxes beneath the descending head C, are carried by slides $f$ which are mounted in ways upon table H. The mechanism for drawing the slides inward to center the boxes is as follows: Centrally mounted upon table H is a circular rotatable disk $f'$ which has pins $f^2$ which engage slots $f^3$ cut into inwardly projecting arms $f^4$ of slide $f$. The rotation of the disk $f'$ actuates the arms $f^4$ to draw them in toward and away from the center of the table. Disk $f'$ is rotated by the following mechanism. The disk has a hub projecting down through the table and secured to a horizontal arm $f^5$. Arm $f^5$ has a slot in its end which engages one arm of a bell crank lever $f^6$ which is pivoted upon bracket $f^7$ secured to the under side of the table H. The other end of the bell crank lever is engaged by a rod $f^8$ which is pivoted at its lower end to horizontal rod $f^9$ which at its other end is pivoted upon a standard $k^4$ secured upon foundation plate K. Rod $f^8$ has a frame $f^{10}$ in it (see Fig. 20) which engages a cam $f^{11}$ secured upon main shaft M. The rotation of the shaft M imparts a vertical reciprocation to rod $f^8$ which is changed by bell crank lever $f^6$ into a rocking motion of the disk $f'$ which draws the frames F inward to center the box beneath the descending head C. Head C has upwardly projecting rods $c'$ $c^2$, which pass upward through ways $h^3$ and have upon their upper ends a connecting bar $c^3$. Retainer plate $c$ has a vertical rack rod $c^4$ projecting up through head C and plate $h^2$, the head C resting upon the retainer plate $c$ and being carried up and down thereby. Rack rod $c^4$ is engaged by a pinion $c^5$ carried by a lever $c^6$ which is pivoted upon fixed arms $h^4$ carried by plate $h^2$. Lever $c^6$ is engaged by a rod $c^7$ which at its lower end engages a bell crank lever $c^8$ (see Fig. 6). Bell crank lever $c^8$ is mounted upon a horizontal shaft $k$ mounted upon the foundation plate K and is pivoted to a horizontal rod $c^9$ which carries a box $c^{10}$ which is engaged by a cam $c^{11}$ which is mounted upon the main shaft M. The reciprocation of rod $c^9$ rotates bell crank lever $c^8$ and thereby imparts a vertical reciprocating motion to the head C. Adjacent to rods $c'$ $c^2$ is a vertical rod $h^5$ carried by the plate $h^2$. Rod $h^5$ carries a hook $h^6$ which as the head descends engages rod $c^3$ and holds the head C stationary while retainer plate $c$ is descending into the box, in the first step of the operation. (See Fig. 15).

Figure 1:
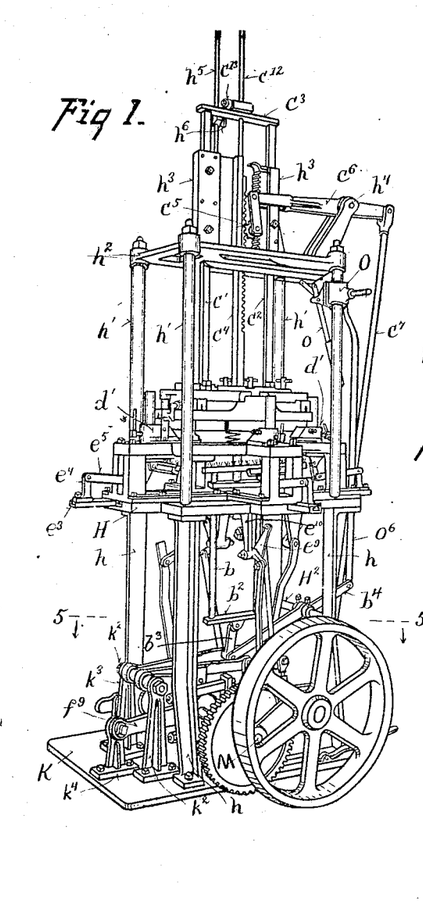
Figure 1 is a perspective view of a machine embodying my invention.
Figures 2, 25:
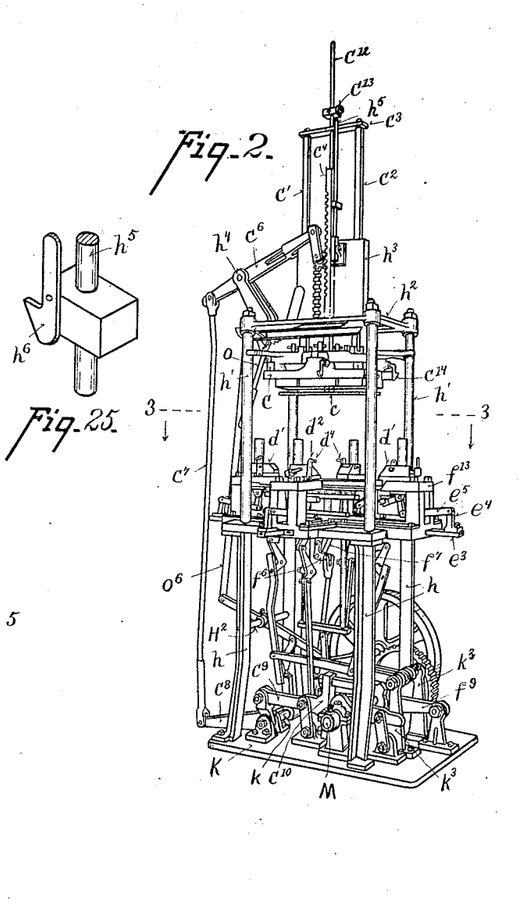
Fig. 2 is a perspective view taken from the opposite side of the machine from that of Fig. 1.
Fig. 25 (Sheet 1) is a detail perspective view upon an enlarged scale of the catch for detaining the block in its downward movement.
Figure 3:
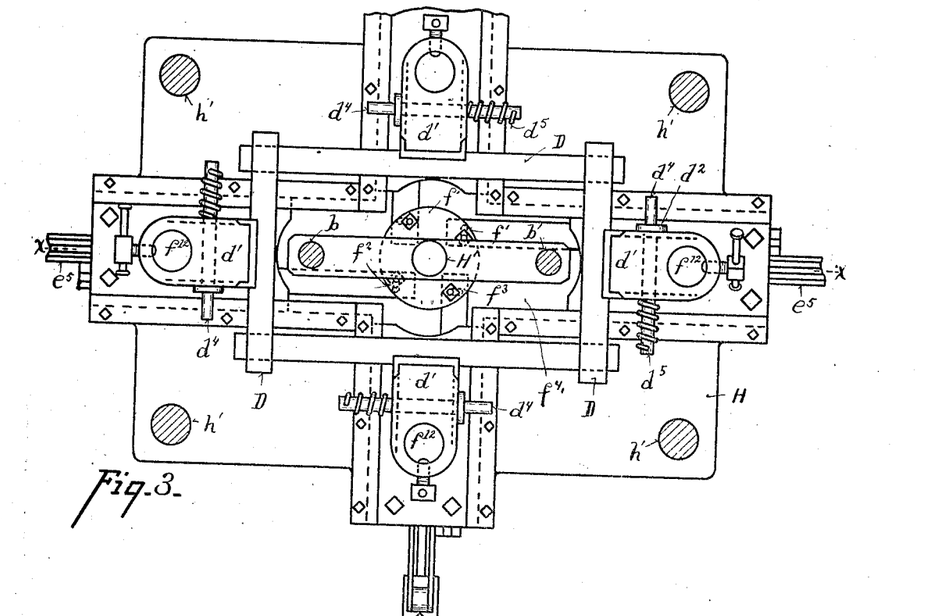
Fig. 3 is a top plan view of the same taken upon line 3—3 of Fig. 2, upon an enlarged scale.
Figure 4:
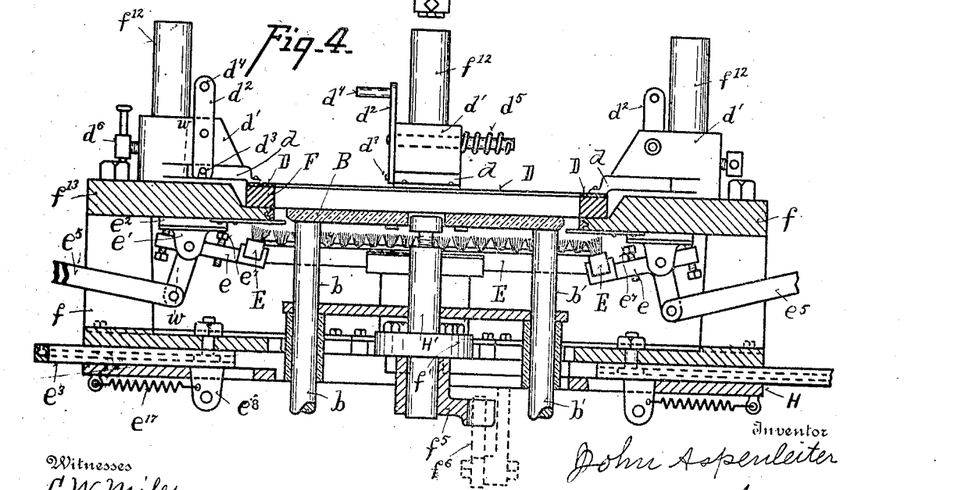
Fig. 4 is a longitudinal vertical sectional view taken upon line $x$—$x$ of Fig. 3.
Figure 5:
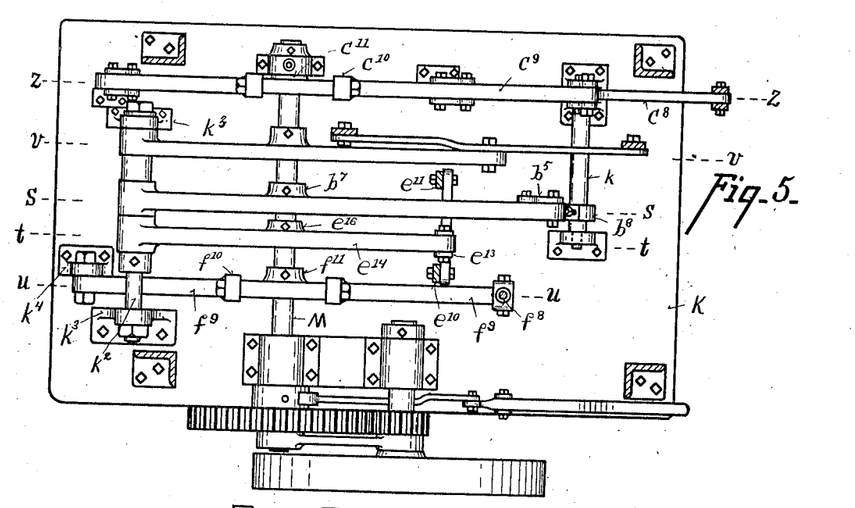
Fig. 5 is a sectional plan view taken upon line 5—5 of Fig. 1, upon an enlarged scale.
Figure 6:
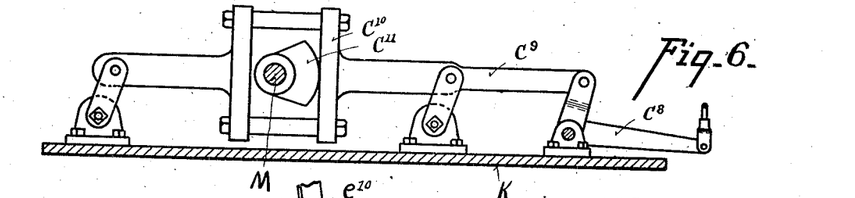
Fig. 6 is a vertical sectional view taken upon line $z$—$z$ of Fig. 5.
Figure 7:
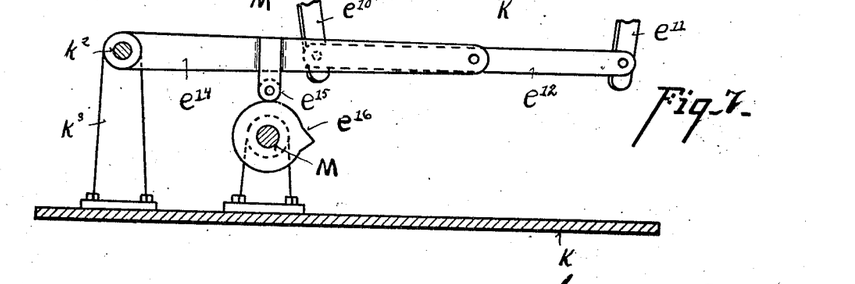
Fig. 7 is a similar view taken upon line $v$—$v$ of Fig. 5.

Rack $c^4$ has an upwardly projecting rod $c^{12}$ which carries a roller $c^{13}$ which after the box has been centered and the paper turned down over the edge by the bar D, strikes hook $h^6$ and carries it out of engagement with rod $c^3$ allowing the weight of the head C to carry it downward into the box to press the paper down as afore described. Just before head C thus descends the bars D are carried inward over the edge of the box. These bars are actuated by the descent of the head C in the following manner. Bars D are carried by frames $d$ sliding in the ways in blocks $d'$, which are mounted upon slides $f$. Blocks $d'$ have pivoted to their sides levers $d^2$ which at their lower ends engage pins $d^3$ upon the frames $d$ as shown in Fig. 4 and at their upper ends have horizontal pins $d^4$ which project outwardly in the paths of arms $c^{14}$ which are carried by head C and which strike the pins $d^4$ rotate the arm $d^2$ and carry the bars D inward just before head C enters the box. When released from arms $c^{14}$ the bars D are returned to their normal position by springs $d^5$ secured to the fulcrums of the arm $d^2$, as shown in Fig. 4. Blocks $d'$ have vertical perforations therein to pass vertical rods $f^{12}$ which are fixed upon slides $f$. By means of set screws $d^6$ blocks $d'$ may be adjusted at any desired height above slides $f$ to accommodate the bars D to any height of box. Bars D are in horizontal planes. The bars at the end are situated immediately above the side bars and when the head C engages pin $d^4$, the bars are carried in simultaneously over the upper edge of the box, whereby the corners of the blank are folded smoothly.

Figure 9:
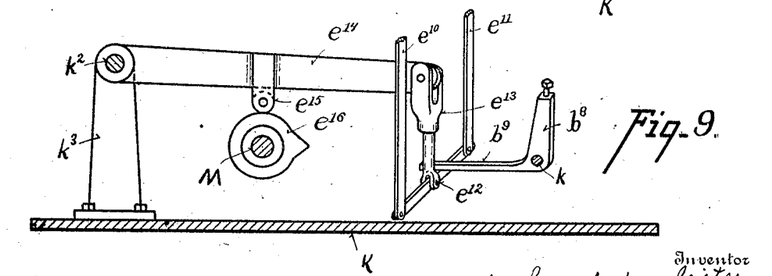
Fig. 9 is a similar view taken upon line $t$—$t$ of Fig. 5.
Figure 12:
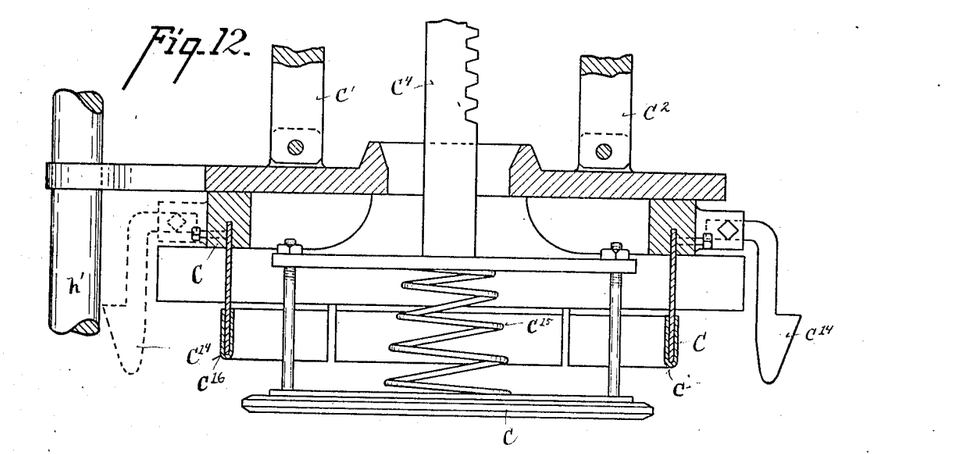
Fig. 12 is a detail central vertical sectional view of the reciprocating head taken upon line $y$—$y$ of Fig. 13 upon an enlarged scale.
Figure 13:
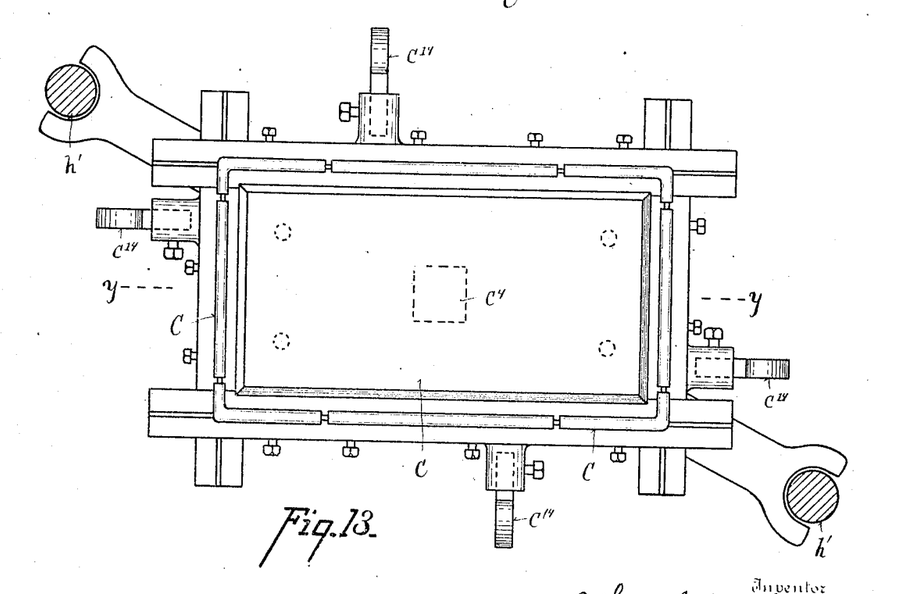
Fig. 13 is a bottom plan view of the same.
Figures 20, 21, 22, 24:
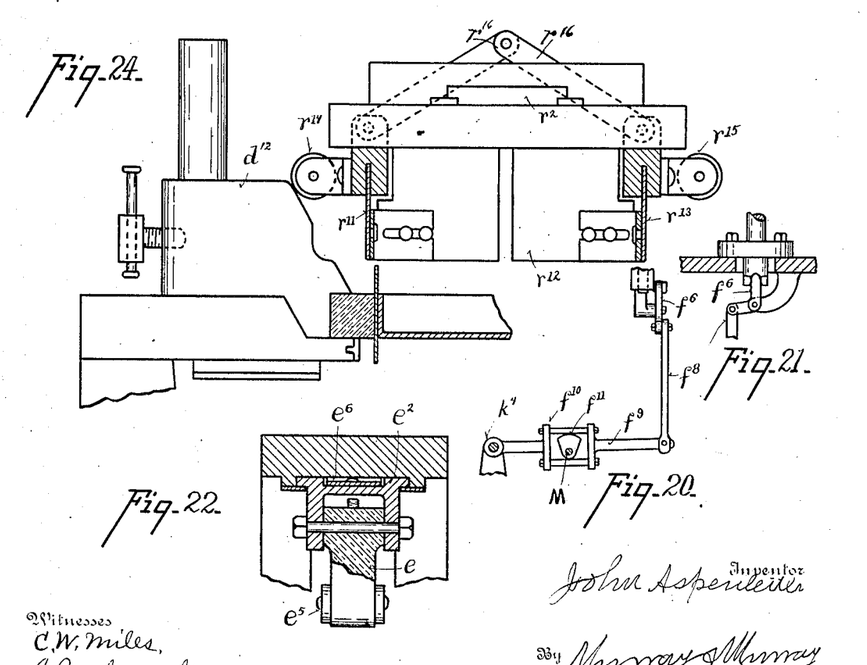
Fig. 20 is a vertical sectional view taken upon line $u$—$u$ of Fig. 5 upon a reduced scale.
Fig. 21 is a detail view of the bell crank mechanism shown in Fig. 20.
Fig. 22 is a detail perspective view taken upon line $w$—$w$ of Fig. 4.
Fig. 24 is a detail vertical sectional view of the same.

In the next step of the operation the base plate B descends, the box being then supported upon stud H', and the brushes E are carried inward to press the paper around the bottom edge of box A. The mechanism by which the brushes are operated will be described first, for the reason that the means which lowers base plate B are actuated by the brush mechanism. Brushes E are mounted upon one end of bell crank levers $e$ which are journaled in brackets $e'$ projecting down from sliding bars $e^2$ which are mounted upon the under side of the upper member $f^{13}$ of each of the four slides $f$. Beneath each of the slides $f$ ways are formed in the table H in which are mounted reciprocating bars $e^3$ which project out beyond the sides of the table H and have vertical posts $e^4$ secured upon the other outer ends. Posts $e^4$ are connected by a link $e^5$ to the ends of bell crank levers $e$. Sliding bars $e^2$ fit their ways loosely and have flat springs $e^6$ bearing down upon them, as shown in Fig. 22 so as to render their sliding in the ways somewhat stiff so that when the link $e^5$ is pushed inward the first action is to rotate the bell crank lever $e$ upon its pivot upward so as to bring it on a level with the bottom of the box, the further rotation of the bell crank lever being stopped by stud $e^7$, coming in contact with the under side of the upper member $f^{13}$ of slides $f$. A farther pressure inward of rod $e^5$ then causes bars $e^2$ to slide in their ways carrying brushes E against the bottom of the box and pressing the paper around the edge thereof. When a backward pressure is exerted on rod $e^5$ the first result is to rotate bell crank lever $e$ downward so that the brush in its return movement does not scrape paper away from the box. The four brushes, that is, the brushes for the ends and for the sides of the box are alike in construction thus far set forth. The mechanism by which slides $e^3$ are reciprocated will now be described. Slides $e^3$ have studs $e^8$ projecting down through ways in the bottom of the table, and these studs $e^8$ are pivoted to bell crank levers $e^9$ which are journaled in brackets which project downward from bottom of table H. The means by which the brushes are operated are the same for each set, that is, the sets which are at the end of the box, and the sets which are at the side. A description therefore will be given of only one set of the mechanism. Each of bell crank levers $e^9$ of one set are connected to rods $e^{10}$ and $e^{11}$ (see Fig. 9), which at their lower ends are connected by a rod $e^{12}$ which is connected by a link $e^{13}$ to a lever $e^{14}$ which is pivoted at its other end on shaft $k^2$. Lever $e^{14}$ has a roller $e^{15}$ which contacts a cam $e^{16}$ mounted upon shaft M. The rotation of shaft M through cam $e^{16}$ raises lever $e^{14}$ rocks bell crank lever $e^9$ and carries the sliding bar $e^3$ inward. The bar $e^3$ is returned to its normal position by a spring $e^{17}$ (see Fig. 4).

Figures 8, 10, 11:
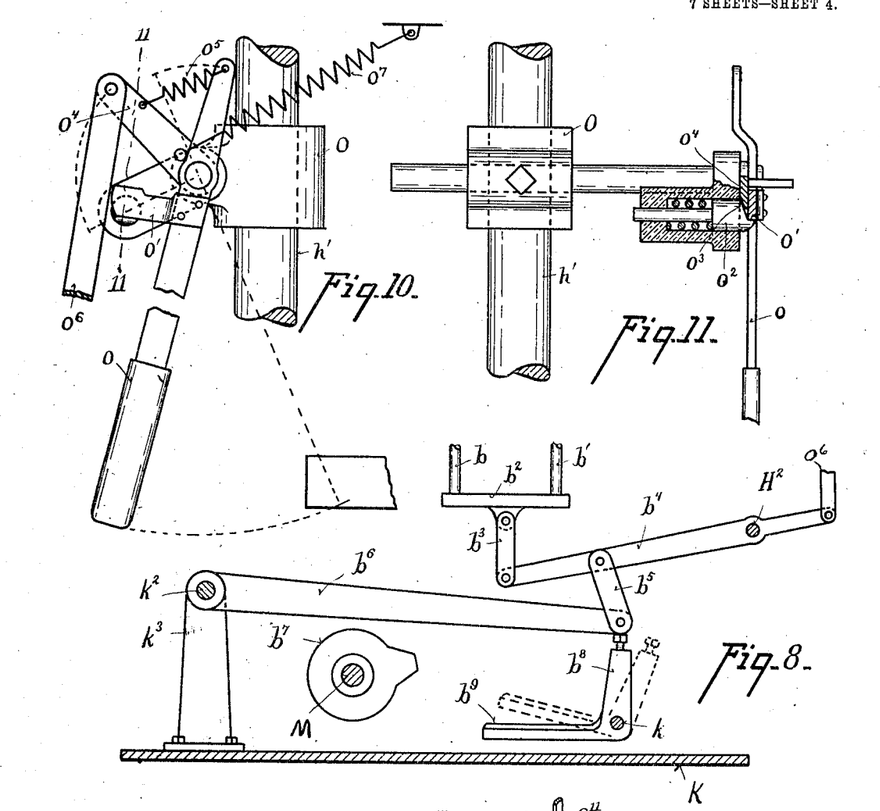
Fig. 8 is a similar view taken upon line $s$—$s$ of Fig. 5.
Fig. 10 is a detail elevation of the mechanism for discharging the boxes from the machine after the operation is complete.
Fig. 11 is a vertical sectional view taken upon line 11—11 of Fig. 10.

The means by which base plate B is lowered just before the brushes are carried inward is as follows. Rod $b^6$ rests in its normal position upon a bell crank lever $b^8$ which is fulcrumed upon shaft $k$ and has an arm $b^9$ which projects over the path of rod $e^{12}$ (see Figs. 8 and 9). When rod $e^{14}$ is raised to carry the brushes inward, rod $e^{12}$ contacts arm $b^9$ and throws the bell crank lever out from under $b^6$ which then drops to allow the base plate B to fall to the table of its own weight, a position which it occupies until it is raised to its uppermost position by the cam $b^7$ to carry the box upward after it has been covered. After rod $e^{12}$ has been again lowered bell crank lever $b^9$ assumes its normal position of its own weight to retain base plate B in its normal position upon its return. The means by which additional pressure is brought upon frames F to cause the paper to adhere more closely to the sides is simply this. When rod $e^3$ is carried inward to carry brushes over the bottom of the box post $e^4$ strikes slide $f$ and causes it to be pushed inward somewhat thereby pressing frames F firmly against the sides of the box.

The means by which the completed box is knocked off of the base plate B in its raised position as shown in Fig. 19, will now be described. Upon a bracket O mounted upon one of the rods $h'$ is pivoted a rod $o$ which has a rearwardly projecting arm $o'$ (see Figs. 10 and 11) which is engaged normally by a spring stud $o^2$ mounted in bracket O. Stud $o^2$ has a tapered face $o^3$. Journaled upon the same pivot with arm $o$ is a link $o^4$. Link $o^4$ and the upper end of rod $o$ are connected by a coiled spring $o^5$ and link $o^4$ is connected by a rod $o^6$ with the end of rod $b^4$ beyond stationary rod $H^2$. Now then, when rod $b^6$ is raised to carry the base plate B upward rod $o^6$ is lowered thereby drawing link $o^4$ downward between arms $o'$ and the taper face $o^3$ of the spring stud $o^2$ thereby forcing arm $o'$ out of contact with the stud, which event occurs just as the base plate B reaches the upper limit of its travel. The spring $o^5$ then throws arm $o$ forward with a jerk so that it hits the box and knocks it off of the base plate clear of the machine. When the base plate again descends the knocker is returned to its normal position by a spring $o^7$ secured to link $o^4$ at one end and to plate $h^2$ at the other. I prefer to cover the sides $c^{16}$ of the head C with felt. Between retainer plate $c$ and head C I likewise place a coiled spring $c^{15}$ which causes the retainer plate to hold the box to the base plate B with a yielding pressure.

Figure 23:
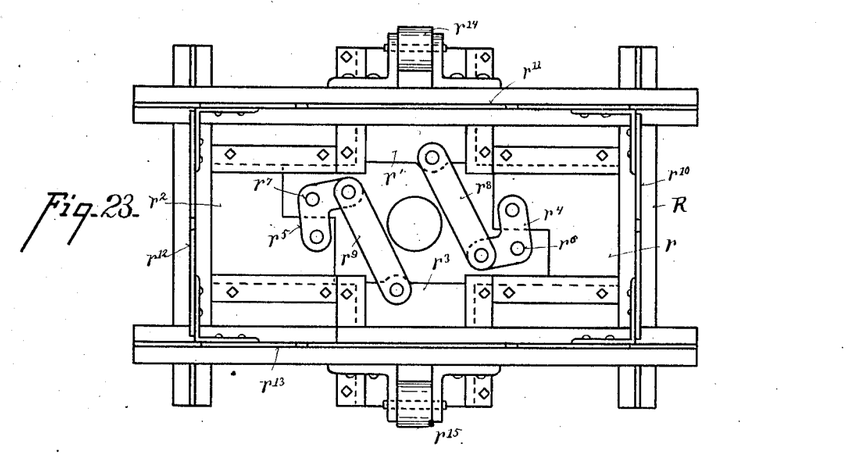
Fig. 23 is a plan view of a modified form of the reciprocating head.

In Figs. 23 and 24 I have illustrated a modified form of reciprocating head. In this modification bars D are omitted. Reciprocating head R has four ways formed in it at right angles to each other in which are four sliding arms $r\ r'\ r^2\ r^3$. Arms $r\ r^2$ have pivoted to them bell crank levers $r^4\ r^5$ which are turned upon pivots $r^6\ r^7$ in head R and the other ends of which are connected by links $r^8\ r^9$ to slides $r'\ r^3$ so that when either set of arms are drawn inward toward center or outward therefrom the other arms perform a similar movement. Slides $r\ r'\ r^2\ r^3$ are secured upon their outer ends to vertical plates $r^{10}\ r^{11}\ r^{12}\ r^{13}$. To the ends of slides $r'\ r^3$ are secured rollers $r^{14}\ r^{15}$ which contact blocks $d^{12}$ to carry the plates $r^{10}\ r^{13}$ inward. The inner faces of blocks $d^{12}$ are tapered. Plates $r^{10}\ r^{13}$ respectively stand outside of the edges of the box when the slides $r^2\ r^3$ are distended. As the head descends, the plates come outside of the edges of the paper strip A. When the rollers $r^{14}$ contact the taper face of the blocks $d^{12}$ the plates are carried inward thereby turning the paper over the edges of the box and pressing the paper against them. The means by which the arms $r\ r'\ r^2\ r^3$ are distended is as follows: Arms $r'\ r^3$ are connected by toggle levers $r^{16}$ which strike plate $h^2$ when the head has reached the upper limit of its travel, which flatten out thereby and cause the plates $r'\ r^3$ to be carried apart likewise carrying plates $r\ r^2$ apart. In place of using brush in the brushes E, I may use felt.

I have shown the invention in the form in which I have used it, but it is obvious that many more mechanical changes might be made in the construction shown without departing from the spirit or scope of my invention, and hence I do not wish to be limited to the specific means shown.

What I claim is.

1. The combination of means for supporting a box having paper covering pasted on its sides, brushes to be carried inward to press the paper against the bottom of the box, and means for drawing the brushes downward and backward after the operation substantially as shown and described.

2. The combination of a base plate for supporting a box having the paper covering pasted to its sides, and projecting beyond its upper and lower edges, plates to be carried inward over the upper edge of the box to turn the paper down, a head to descend and press the paper against the inner sides of the box, brushes to be carried inward across the bottom of the box to carry the paper against the same, means for carrying the brushes downward and backward after operation and means for actuating the plates, and head substantially as shown and described.

3. The combination of a base plate for supporting a box of the character described, frames for centering the box upon the base plate, plates to be projected over the edge of the box for carrying the paper inward, a reciprocating head to enter the box to turn the paper down over the edges thereof, brushes to be carried across the lower edge of the box, means for carrying the brushes downward and backward after operation and means for actuating the frames, the plates, and reciprocating head, substantially as shown and described.

4. The combination of a table for supporting a box of the character described, a vertical reciprocating retainer plate, bars to be projected over the edges of the box, a head resting upon the retainer plate, means for checking the downward motion of the head while the plates are being carried over the edge of the box, means carried by the retainer plate for then releasing the head, means whereby the head engages the plates to carry them inward before it enters the box to turn the paper down and means for reciprocating the retainer plate substantially as shown and described.

5. The combination of a table, a sliding bar in ways in the table, a bell crank lever pivoted to the sliding bar, brushes carried by one arm of the bell crank lever, means for creating a friction between the sliding bar and its ways a rod attached to the other arm of the bell crank lever, and means for carrying the bar inward, whereby the brushes are raised first and then carried inward and upon the return motion the brushes are lowered and then drawn back substantially as shown and described.

6. The combination of a table for supporting a box of the character described, plates mounted upon the table for being projected over the edge of the box to carry the paper inward, levers pivoted upon the table and engaging the plates at one of their ends, a vertical reciprocating retaining plate, a head resting upon the retainer plate, means for detaining the head in its descent while the retainer plate engages the box to hold it in place, means carried by the retainer plate for then releasing the head, and arms carried by the head for engaging the levers and carrying the plates inward before the head enters the box substantially as shown and described.

7. The combination of a table having radial ways therein, slides mounted in the ways, a base plate upon the table for supporting a box having the paper covering pasted on its sides, frames mounted upon the slides for centering the box, plates mounted upon the slides to be projected inward over the edge of the box, a reciprocating head for entering the box to turn the paper down, and means carried by the head for engaging the plates and carrying them inward before the head enters the box substantially as shown and described.

8. The combination of a table, a base plate supported thereby, a stud passing through the base plate and fixed to the table, said stud constituting a support for a box, plates to be projected over upper edge of the box placed upon the base plate, brushes to be carried across bottom of the box, a reciprocating head for entering the box, means for actuating the head, and means for lowering the base plate below the upper end of the stud before brushes are carried inward substantially as shown and described.

9. The combination of means for supporting a box having covering material pasted to its sides and projecting below the bottom thereof, and means for pressing the said projecting portions of the covering material against the bottom of the box, comprising slidably mounted brushes located upon opposite sides of the said box supporting means, and means for advancing the said brushes in one plane and retracting them in another plane.

10. The combination with means for supporting a box having covering material pasted to its sides and projecting below the bottom thereof, of means for pressing the said projecting portions of the covering material against the bottom of the box, comprising vertically disposed wiping devices arranged upon opposite sides of the box supporting means below the plane thereof, and means for advancing said wiping devices in one plane and retracting them in another plane.

11. The combination of a base plate for supporting a box of the character described, plates for being projected over the upper edge of the box for carrying the paper inward, a reciprocating head for entering the box and turning the paper down, brushes to be carried across the bottom edge of the box, means for actuating the plates, the head and the brushes, means for lowering the base plate before the brushes are carried inward, means for supporting the box elevated when the base plate is lowered, and means for raising the base plate above the plane of the brushes after the operation of the brushes substantially as shown and described.

12. The combination of a table having radial ways, a base plate for supporting a box, slides in the ways, centering frames carried by slides, turning in bars mounted upon the slides, brush carriers pivoted to the slides a vertical reciprocating head, means for carrying slides inward to center the box, means for carrying the turning in bars inward over the edge of the box, and means for carrying brushes inward substantially as shown and described.

13. In a machine of the class described, the combination with a table, of a bar slidable in ways in the table, a bell crank lever pivoted to the sliding bar, a brush carried by one arm of the bell crank lever, a rod attached to the other arm of said lever, and means for actuating the bar, whereby the brush will first be raised, then moved inward, and finally lowered and drawn back, substantially as and for the purpose described.

14. In a machine of the class described, the combination with a base-plate for supporting a box having paper covering pasted to its sides, a table, blocks mounted upon the table and adjustable vertically relatively to the base plate, plates carried by the blocks to be projected inward over the upper edge of the box, a reciprocating head to enter the box after the plates have been projected over the edge, and means for actuating the plates and head.

15. In a machine of the class described, the combination of a base plate for supporting a box to be covered, said base plate having an opening therethrough, a stud in line with said opening, means for lowering the base plate below the upper end of the stud, means for pressing the lower projecting edges of the covering material against the bottom of the box when the base plate is lowered and means for raising the base plate above the plane of the said pressing means after the latter have acted.

16. In a machine of the class described, a base plate for supporting a box to be covered, slides for engaging the sides and ends of the box to center the same upon the base plate, means for turning the covering paper over the upper edges of the box and down into the latter, means for causing the said slides to impart a pressure externally of the box walls after the turning-in means have acted and means for actuating the slides, consisting of a rotatable disk and mechanism for rotating the disk.

17. The combination with means for supporting a box having covering material pasted to its sides and projecting below the bottom thereof, of means for pressing the said projecting portions of the covering material against the bottom of the box, comprising vertically disposed brushes arranged upon opposite sides of the box supporting means, and means for advancing and retracting said brushes in different planes respectively.

18. In a machine of the class described, the combination with a base plate for supporting a box having paper covering pasted to its sides, of means for turning the upper edges of the covering paper over the upper edges of the box walls, a vertically reciprocating head for forcing the turned over edges of the paper down into the box, a yielding retainer arranged to enter the box in advance of the head, means for causing said retainer to enter the box, and means operated by the retainer actuating means for controlling the movement of the head.

19. In a machine of the class described, the combination with a base plate for supporting a box having paper covering pasted to its sides, of means for turning the projecting edges of the covering paper over the upper edges of the box walls, a vertically reciprocatory head arranged to enter the box to force the said projecting edges of the paper thereinto and means actuated by the descent of the head for actuating the said turning-in means.

20. In a machine of the class described, the combination with a base plate for supporting a box having paper covering pasted on its sides, of bars for turning the projecting edges of the paper over the upper edges of the box walls, a vertically reciprocatory head for forcing the said projecting edges of the paper down into the box, and means actuated by the head for operating the bars.

21. In a machine of the class described, the combination with a base plate for supporting a box having paper covering pasted to its sides, bars for turning the projecting edges of the paper over the upper edges of the box, a vertically reciprocatory head for forcing the said projecting edges of the paper down into the box, means actuated by the head during its descent for thrusting the bars inward, and means for retracting the bars.

22. In a machine of the class described, the combination with a base plate for supporting a box having paper covering pasted to its sides, bars for turning the projecting edges of the paper over the upper edges of the box walls, pivoted arms each having connection with one of said bars, a vertically reciprocatory head arranged to force the projecting edges of the paper downward into the box, and means on the head for engaging the said pivoted arms to actuate the bars.

23. In a machine of the class described, the combination with a base plate for supporting a box having paper covering pasted to its side, of bars for turning the projecting edges of the paper over the upper edges of the box, a pivoted arm having a connection with each bar, a pin projecting from each arm, a vertically reciprocatory head arranged to enter the box and force the projecting edges of the paper down into the same and projections on the head for engaging the pins during the descent of the head, whereby to actuate the bars.

24. In combination with means for supporting a box having covering material pasted to its sides and projecting below the bottom thereof, of means for pressing the said projecting portions of the covering material against the bottom of the box, comprising vertically disposed wiping devices arranged upon opposite sides of the box supporting means below the plane thereof, means for advancing and retracting said wiping devices in different planes respectively, and means for centering the box on its support relatively to the wiping devices prior to the operation thereof.

25. In combination with means for supporting a box having covering material pasted to its sides with portions projecting below the bottom of the box, of means for pressing the said projecting portions of the covering material against the bottom of the box, comprising brushes to be carried across the bottom edges of the box, means for advancing and retracting the brushes in different planes respectively, means for lowering the box supporting means before the brushes are advanced, and means for supporting the box elevated when the supporting means is lowered.

26. In a machine of the character described, means for supporting a box having covering material pasted to its side walls and projecting above and below the upper and lower edges thereof, means for turning the upper projecting portions of the covering material over the upper edges of the box walls and affixing the same to the interior thereof, and means for pressing the said lower projecting portions of the covering material against the bottom of the box, comprising slidably mounted brushes arranged upon opposite sides of the said box supporting means, and means for advancing and retracting the brushes in different planes respectively.

JOHN ASPENLEITER.

Witnesses:
W. F. MURRAY,
A. McCORMACK.